US006917840B2

(12) United States Patent
Lund

(10) Patent No.: US 6,917,840 B2
(45) Date of Patent: Jul. 12, 2005

(54) METHOD OF ASCERTAINING CONTROL PARAMETERS FOR A CONTROL SYSTEM

(75) Inventor: Richard A. Lund, Chaska, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 10/323,707

(22) Filed: Dec. 18, 2002

(65) Prior Publication Data

US 2003/0139825 A1 Jul. 24, 2003

Related U.S. Application Data

(60) Provisional application No. 60/341,887, filed on Dec. 18, 2001.

(51) Int. Cl.[7] .............................................. G05B 13/02
(52) U.S. Cl. ............................ 700/33; 700/29; 700/34; 700/37; 700/53; 703/2
(58) Field of Search ............................... 700/28–34, 37, 700/44, 45, 53, 73, 82; 703/2; 318/561

(56) References Cited

U.S. PATENT DOCUMENTS

| | | | | |
|---|---|---|---|---|
| 4,195,337 A | * | 3/1980 | Bertrand et al. ............... | 700/31 |
| 4,214,300 A | * | 7/1980 | Barlow et al. ................ | 700/32 |
| 4,234,142 A | * | 11/1980 | Yost et al. .................. | 244/3.21 |
| 4,537,077 A | | 8/1985 | Clark et al. ................... | 73/665 |
| 4,882,526 A | * | 11/1989 | Iino et al. .................... | 318/561 |
| 5,329,443 A | * | 7/1994 | Bonaquist et al. ............ | 700/33 |
| 5,400,247 A | * | 3/1995 | He ................................ | 700/53 |
| 5,623,402 A | * | 4/1997 | Johnson ........................ | 700/42 |
| 5,689,427 A | * | 11/1997 | Li et al. ...................... | 700/162 |
| 6,128,541 A | * | 10/2000 | Junk ............................. | 700/39 |
| 6,185,470 B1 | * | 2/2001 | Pado et al. .................. | 700/104 |
| 6,195,596 B1 | * | 2/2001 | Kim ............................ | 700/245 |
| 6,253,113 B1 | | 6/2001 | Lu .............................. | 700/28 |
| RE37,374 E | * | 9/2001 | Roston et al. ............... | 318/561 |
| 6,640,638 B1 | | 11/2003 | Haeg et al. ................... | 73/669 |
| 6,701,195 B2 | * | 3/2004 | Brown et al. ................. | 700/44 |
| 2002/0111758 A1 | * | 8/2002 | Wang et al. .................. | 702/79 |

FOREIGN PATENT DOCUMENTS

WO    WO 98/26335    6/1998    ........... G05B/11/42

OTHER PUBLICATIONS

Scheu "Automatic Tuning of PID Controllers Based on Transfer Function Estimation", vol. 30, No. 12, pp. 1983–1989, 1994.
Kanno et al. "Optimization System For Control Systems Design", IECON '94, pp. 1882–1887.
Panagopoulos et al. "A Numerical Method for Design of PI Controllers", IEEE Conference, pp. 417–422, Oct. 5–7, 1997.
Desoer et al., "Stability of Multiple–Loop Feedback Linear Time–Invariant Systems", Journal of Mathematical Analysis and Applications, vol. 23, pp. 121–129, 1968.
Elsey et al., "JASON Procedure for Design of Multivariable Control Systems", Ind. Eng. Chem. Process Dec. Development, vol. 10, No. 4, pp. 431–441, 1971.
Lund, Richard A., Multivariable Computer control of a Gas Metal Arc Welding Process, Ph.D. Thesis, University of Wisconsin, Madison, Wisconsin, 1977 (Table of Contents, Chapters 1, 6, 7, 8, 9; Appendices D, F, G; References).
Pannala, et al, "Controller Design for a Multichannel Electrohydraulic System", Journal of Dynamic Systems, Measurement, and Control, vol. 111, pp. 299–306, Jun. 1989.
Ramachandran et al., "Interaction Between the Actuators in Loaded Multi–Channel Electrohydraulic Drives", Journal of Dynamic Systems, Measurement, and Control, vol. 115, pp. 291–302, Jun. 1993.

\* cited by examiner

*Primary Examiner*—Anthony Knight
*Assistant Examiner*—Crystal J Barnes
(74) *Attorney, Agent, or Firm*—Westman, Champlin & Kelly, P.A.; Steven M. Koehler

(57) ABSTRACT

A method of ascertaining control parameters for a control system having a controller and a plant includes establishing a model of the plant and a model of the controller and calculating a performance index for a closed-loop system as a function of controller parameters, accounting for selected stability margins.

21 Claims, 16 Drawing Sheets

METHOD OF ASCERTAINING CONTROL PARAMETERS FOR A CONTROL SYSTEM

CROSS-REFERENCE TO RELATED APPLICATION

This application claims the benefit of U.S. Provisional Patent Application 60/341,887, filed Dec. 18, 2001, the content of which is hereby incorporated by reference in its entirety.

BACKGROUND OF THE INVENTION

The present invention relates to control of a system machine or process. More particularly, the present invention relates to ascertaining control parameters for a controller to tune a system and achieve acceptable closed-loop control.

Control systems are used in a wide variety of fields, such as industrial processes, environmental systems, electronic systems, mechanical systems, and any other system where system output variables representing measurements and user specified desired outputs are processed to generate signals that control devices which change the system. For example, vibration systems, which are well known, apply loads and/or motions to test specimens. Vibration systems are widely used for performance evaluation, durability tests, and various other purposes, as they are highly effective in the development of products. For instance, it is quite common in the development of automobiles, motorcycles, or the like, to subject the vehicle or a sub-structure thereof to a laboratory environment that simulates operating conditions such as a road or test track.

Physical simulation in the laboratory involves a well-known method of data acquisition and analysis in order to develop drive signals that can be applied to the vibration system to reproduce the operating environment. This method includes instrumenting the vehicle with transducers "remote" to the physical inputs of the operating environment. Common remote transducers include, but are not limited to, strain gauges, accelerometers, and displacement sensors, which implicitly define the operating environment of interest. The vehicle is then driven in the operating environment, while remote transducer responses (internal loads and/or motions) are recorded. During simulation with the vehicle mounted to the vibration system, actuators of the vibration system are driven so as to reproduce the recorded remote transducer responses on the vehicle in the laboratory.

However, before simulation testing can occur, the control system must be tuned. Tuning is the process of setting the controller's internal logic, circuitry and/or variables so that the controller's output signals cause the desired effect given the controller's feedbacks.

Generally, the overall system can be organized or defined as having two principle components, i.e., the "controller" and the "plant". Operating in closed-loop control, the controller receives inputs or otherwise has stored information pertaining to desired operation of the plant. The controller provides actuation signals to the plant and receives therefrom feedback signals, which can include the remote sensors as discussed above pertaining to the desired response of the plant, and/or intermediate feedback signals deemed necessary to achieve the desired response of the plant. The plant comprises all components that are not part of the controller. Using the vibration system discussed above by way of example, the plant or physical system would include the servo valves, which receive the actuation signals from the controller that in turn are used to operate actuators to impart forces or motions upon the test specimen. The plant would also include any necessary linkages between the actuators and the test specimen as well as test specimen itself and sensors (intermediate and/or remote) used to provide feedback signals back to the controller.

The commissioning of control systems is commonly accomplished by constructing a controller of suitable architecture, connecting it to the plant that is to be controlled, exciting the system while adjusting the control parameters (tune the system) until acceptable closed-loop control is achieved. The tuning process typically requires a significant skill level and is often quite tedious in the case of Single Input Single Output (SISO) systems, and can be overwhelming in the case of Multiple Input Multiple Output (MIMO) systems with a high degree of cross-coupling.

Accordingly, there is a continuing need for an improved method of tuning control systems. A method or system that is easy to use and requires minimal actual plant operation would be very beneficial.

SUMMARY OF THE INVENTION

A method of ascertaining control parameters for a control system having a controller and a plant includes establishing a model of the plant and a model of the controller and calculating a performance index for a closed-loop system as a function of controller parameters, accounting for selected stability margins.

DETAILED DESCRIPTION OF THE ILLUSTRATIVE EMBODIMENT

Figure 1:
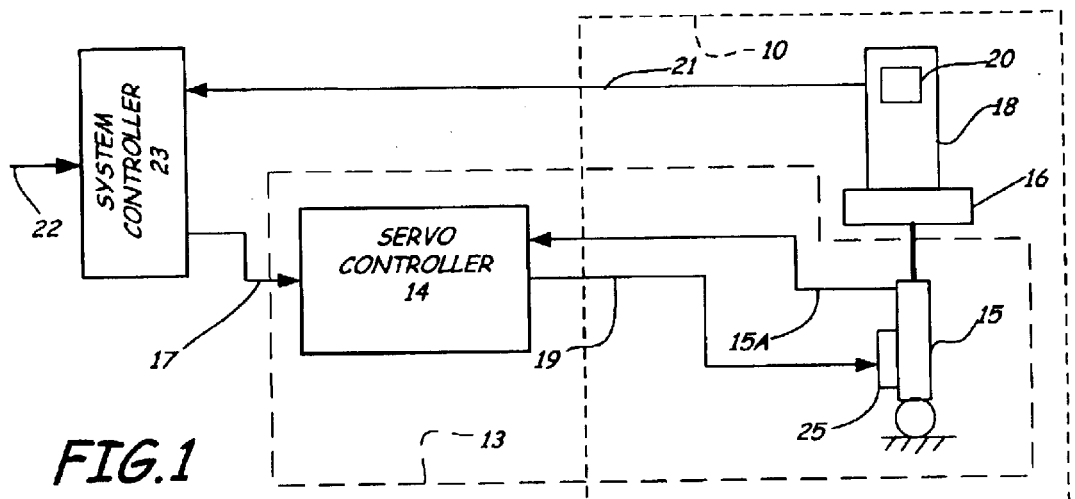
FIG. 1 is a block diagram of an exemplary environment for practicing the present invention.
Figure 3:
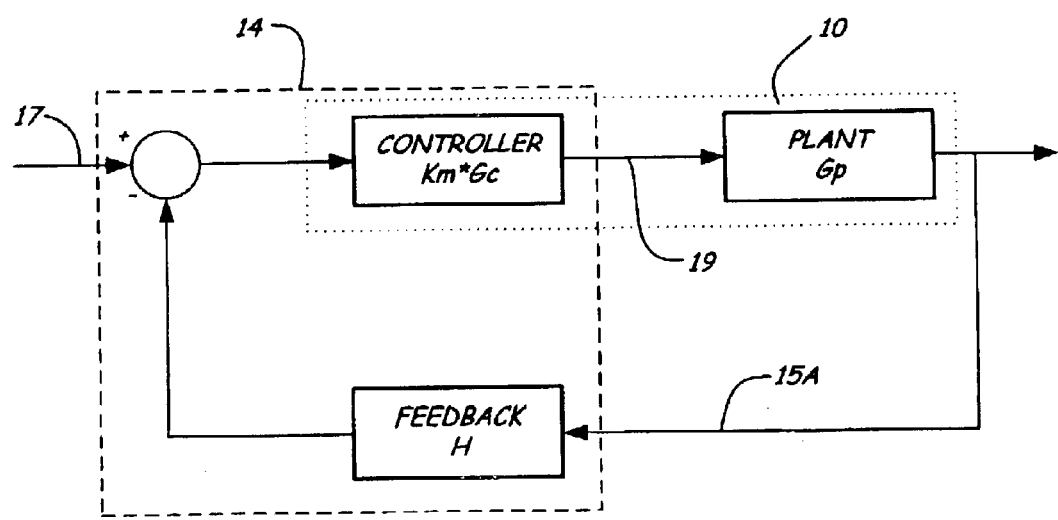
FIG. 3 is a block diagram illustrating components of a closed-loop control system for the environment of FIG. 1.

FIG. 1 illustrates a plant or physical system 10. In the exemplary embodiment, the physical system 10 generally includes a vibration system 13 comprising a servo controller 14 and an actuator 15. In the schematic illustration of FIG. 1, the actuator 15 represents one or more actuators that are coupled through a suitable mechanical interface 16 to a test specimen 18. The servo controller 14 provides an actuator command signal 19 to a servo valve 25 to operate the actuator 15, which in turn, excites the test specimen 18. Suitable feedback 15A can be provided from the actuator 15 to the servo controller 14 or from other sensors. One or more remote transducers 20 on the test specimen 18, such as displacement sensors, strain gauges, accelerometers, or the like, provide a measured or actual response 21. A physical system controller 23 receives an input 22 the actual response 21 as feedback in a response to a drive 17 as input to the servo controller 14. In the illustration of FIG. 1, signal 17 is a reference signal, signal 19 is a manipulated variable (command to actuated device) and signal 15A is a feedback variable. This relationship is also illustrated in FIG. 3. Although illustrated in FIG. 1 for the single channel case, multiple channel embodiments with signal 15A comprising N feedback components and the signal 19 comprising M manipulated variable components are typical and considered another embodiment of the present invention.

Although described herein where the environment comprises the vibration system 13, aspects of the present invention described below can be applied to other plants. For instance, in a manufacturing process, the plant includes the manufacturing machines (e.g. presses, molding apparatus, forming machines, etc.) and the manipulated variable signal 19 provides command signals to said machines, and the feedback signal 15A comprises manual or automatic measured parameters of the plant. Another example includes an oil refinery where the plant is the process plant and the feedback signal 15A comprises intermediate or final parameters related to its operation.

Figure 2:
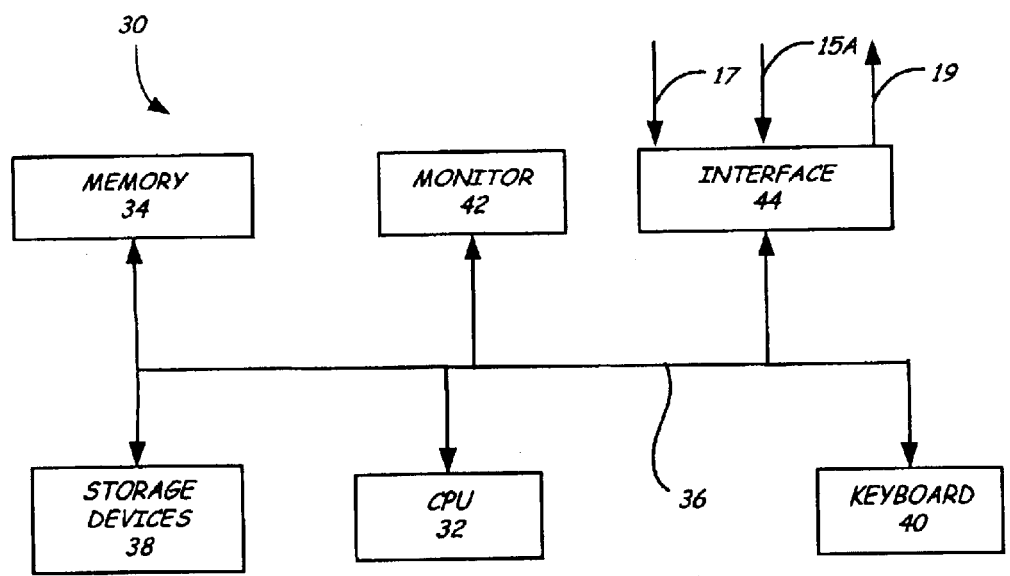
FIG. 2 is a computer for implementing the present invention.

FIG. 2 and the related discussion provide a brief, general description of a suitable computing environment in which the invention may be implemented. Although not required, the servo controller 14 will be described, at least in part, in the general context of computer-executable instructions, such as program modules, being executed by a computer 30. Generally, program modules include routine programs, objects, components, data structures, etc., which perform particular tasks or implement particular abstract data types. The program modules are illustrated below using block diagrams and flowcharts. Those skilled in the art can implement the block diagrams and flowcharts to computer-executable instructions storable on a computer readable medium. Moreover, those skilled in the art will appreciate that the invention may be practiced with other computer system configurations, including multi-processor systems, networked personal computers, mini computers, main frame computers, and the like. The invention may also be practiced in distributed computing environments where tasks are performed by remote processing devices that are linked through a communications network. In a distributed computer environment, program modules may be located in both local and remote memory storage devices.

The computer 30 illustrated in FIG. 2 comprises a conventional personal or desktop computer having a central processing unit (CPU) 32, memory 34 and a system bus 36, which couples various system components, including the memory 34 to the CPU 32. The system bus 36 may be any of several types of bus structures including a memory bus or a memory controller, a peripheral bus, and a local bus using any of a variety of bus architectures. The memory 34 includes read only memory (ROM) and random access memory (RAM). A basic input/output (BIOS) containing the basic routine that helps to transfer information between elements within the computer 30, such as during start-up, is stored in ROM. Storage devices 38, such as a hard disk, a floppy disk drive, an optical disk drive, etc., are coupled to the system bus 36 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 34 from at least one of the storage devices 38 with or without accompanying data.

An input device 40 such as a keyboard, pointing device (mouse), or the like, allows the user to provide commands to the computer 30. A monitor 42 or other type of output device is further connected to the system bus 36 via a suitable interface and provides feedback to the user. The reference signal 17 can be provided as an input to the computer 30 through a communications link, such as a modem, or through the removable media of the storage devices 38. The manipulated variable signals 19 are provided to the plant 10 of FIG. 1 based on program modules executed by the computer 30 and through a suitable interface 44 coupling the computer 30 to the vibration system 13. The interface 44 also receives the feedback signals 15A. Nevertheless, the servo controller 14 can also comprise an analog controller with or without digital supervision as is well known. Drive 17 may be continuously provided or stored in servo controller 14, depending on the capabilities of the servo controller 14. Functions of controller 23 and controller 14 can be combined into one computer system. In another computing environment, controller 14 is a single board computer operable on a network bus of another computer, which could be controller 23 or another supervisory computer. The schematic diagram of FIG. 2 is intended to generally represent these and other suitable computing environments.

Although described below with respect to a test vehicle, it should be understood that the present invention discussed below is not confined to testing only vehicles, but can be used on other processes, types of test specimens and sub-structures or components thereof.

Figure 4:
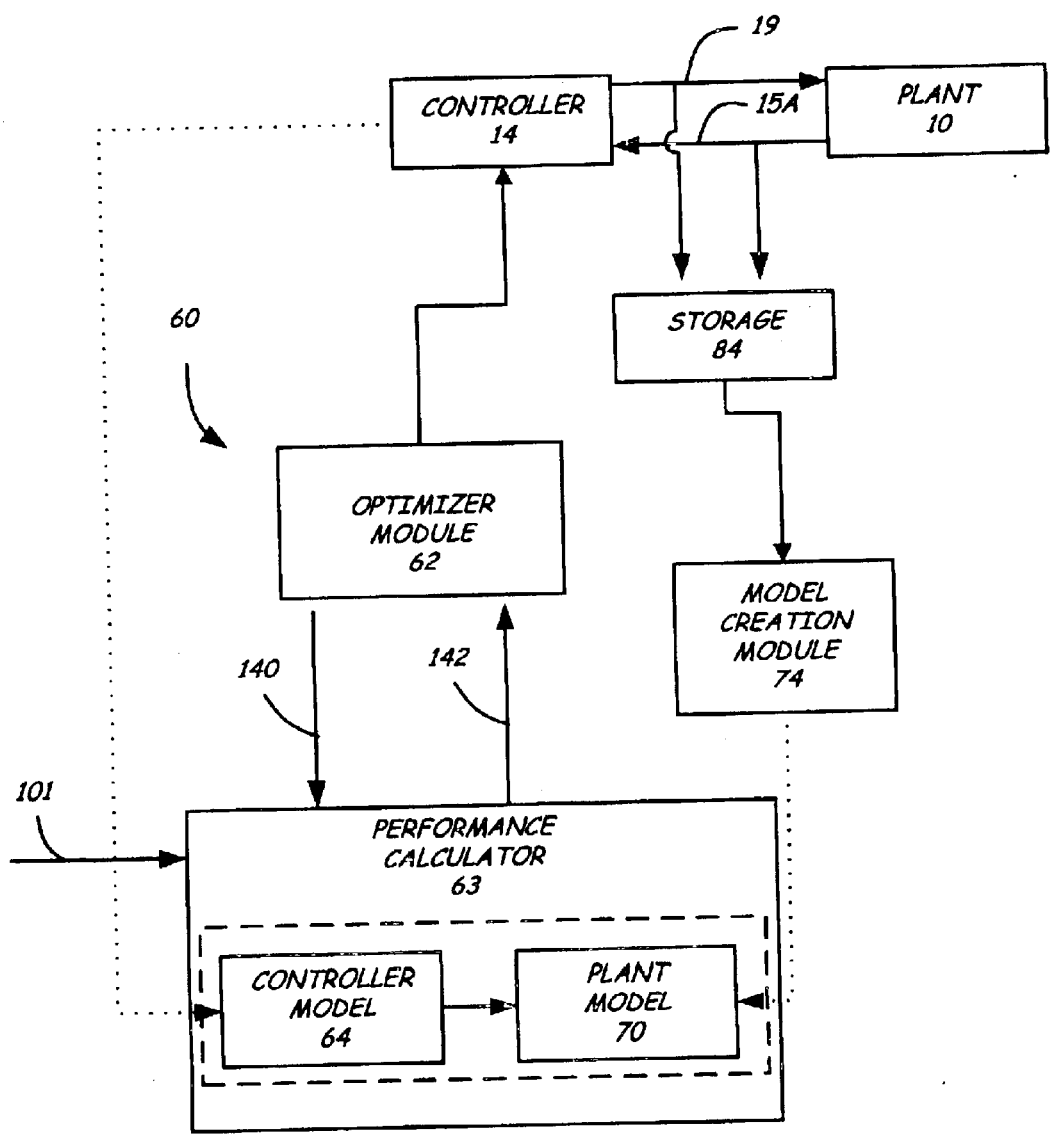
FIG. 4 is a block diagram illustrating a tuning assembly and other aspects of the present invention.

FIG. 4 illustrates a servo controller 14 and the plant 10 along with a tuning or optimization assembly 60. In general, the tuning assembly 60 ascertains or determines control parameters or variables of the servo controller 14 based on user constraints 101. For example, the control parameters can include one or more values that are used generally in a closed-loop control architecture to generate signal 19 in part based on feedback 15A during actual operation of the plant 10. However, the tuning assembly 60 can ascertain the control parameters offline without repeated operation of the plant 10, thereby, saving time and minimizing wear or damage to the plant 10.

In general, the tuning assembly 60 uses a model 64 of the system controller 14 and a model 70 of the plant 10, in one embodiment, both in the frequency domain, in order to estimate a performance index as a function of controller parameter settings and user constraints. Optimization of the performance index using an optimization algorithm such as Nelder-Mead yields the best or optimum set of controller parameters for the servo controller 14. As used herein "best" or "optimum" refers to those values of the controller parameters that have been ascertained by the tuning assembly 60 given user constraints. As appreciated by those skilled in the art, further manual adjustments to the ascertained controller parameters may be possibly made by the user to yield some further improvements in system performance. Nevertheless, the ascertained controller parameters provided by the tuning assembly 60 would achieve desired system performance based on the user constraints, and thus, can be considered "best" or "optimum".

The tuning assembly 60 includes an optimization module 62 and a performance calculator 63. The performance calculator 63 uses the model 64 of the system controller 14 and the model 70 of the plant 10. Before further describing operation of the performance calculator 63 and the optimization module 64, it may be helpful to describe construction of the servo controller model 64 and plant model 70.

As discussed above, the servo controller 14 can be embodied in a digital computer such as computer 30 illustrated in FIG. 2. In many cases, the control architecture is embodied as modules or instructions implementing control functions such as summation, subtraction, integration, differentiation and filtering, just to name a few. Signals 19 are computed using the modules or instructions and converted, if necessary, to analog values through digital-to-analog converters as is well known. Likewise, the reference signal 17 and the feedback signals 15A, if provided in analog form, can be converted to digital values through suitable analog-to-digital converters. Digital values of the reference signal 17 and the feedback signals 15A are then used by the modules defining the control architecture.

Figure 5:
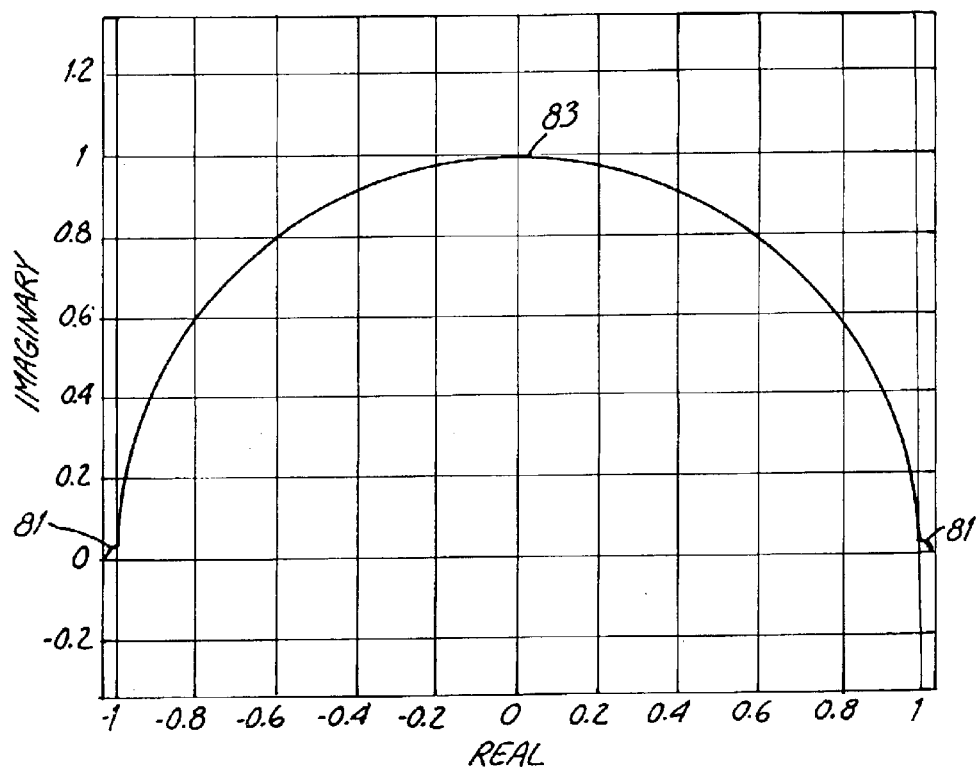
FIG. 5 is a z-plane contour.

The control architecture of servo controller 14 will thus be well defined. Constructing a mathematical representation or model of the servo controller 14 architecture in the frequency domain is well known. A simple exemplary controller structure for illustrative purposes can be $$Gc=Km^*(Kp+Kd^*(z-1)/Tz+Kdd^*((z-1)/Tz)^2),$$

where Km is a scalar and Kp, Kd, Kdd are vectors of length equal to the number of channels being controlled. This form is for the case of an integrating plant such as a servo-hydraulic system. Generally, construction includes substituting discrete values for z according to the plot of FIG. 5 for each of the controller components. In one embodiment, linear spacing along the quarter circles 81 and log spacing along the unit circle 83 realizes an accurate model with a minimum number of data points. It should also be noted that this form of the model can be referred to as a transfer function (TF). A vector of complex values becomes the frequency domain representation of the corresponding controller element. This model can be arranged in a matrix where such vectors commonly, but not exclusively, are disposed along a matrix diagonal.

Figure 6:
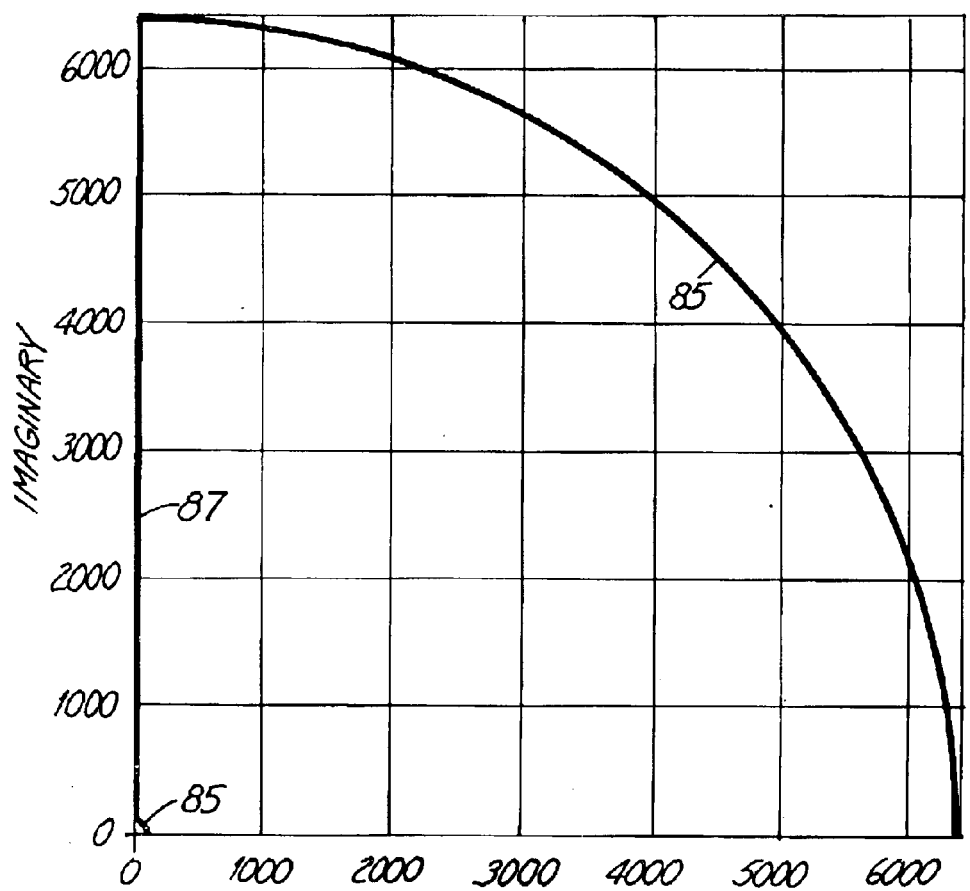
FIG. 6 is a s-plane contour.

It should be noted that if servo controller 14 is constructed of analog components, the servo controller model 64 is formed by substituting discrete values for s according to the plot of FIG. 6 for each of the controller components. A simple illustrative controller structure for this purpose is $Gc=Km^*(Kp+Kd^*s+Kdd^*s^2)$, where Km, Kp, Kd and Kdd are as stated above. This form is for the case of an integrating plant such as a servo-hydraulic system. To minimize the number of data points, linear spacing along the quarter circles 85 and log spacing along the imaginary axis 87 in the s-plane can be used. The models based on the s or z contours can be much more efficient for subsequent calculations (10 times fewer data values), and equally significant is that stability analysis from this data is traceable to first principals of complex analysis. Simplification of this approach to the direct use of the FRF representation can be beneficial in some situations. Actual controller structures that need to be accommodated are typically more complex, but the method of substitution of z and s contours is the same.

Figure 7:
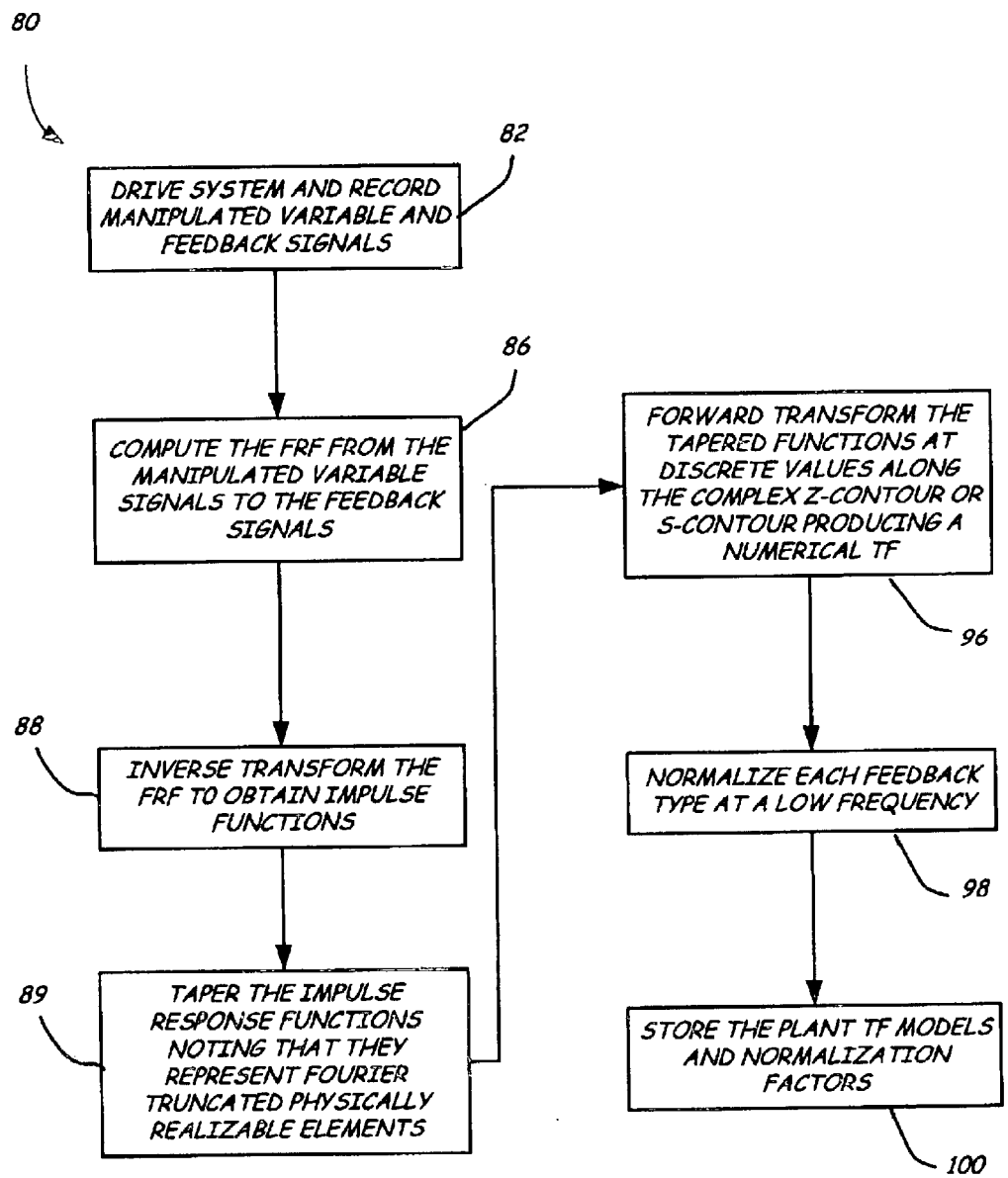
FIG. 7 is a flow diagram of a method for creating a model of the plant.

In a first embodiment, the plant model 70 can be obtained by model creation module 74 from empirical data using method 80 of FIG. 7. Beginning at step 82, servo controller 14 of FIG. 1 is operated to generate manipulated variable signal 19 as a function of a drive 17 having wide spectrum content. For instance, drive 17 can include transients, and/or repeating periodic signals having random phase. A suitable method for formation of drive 17 is described in U.S. Pat. No. 6,385,564, incorporated herein by reference. The manipulated variable signal 19 and the corresponding feedback signal 15 during operation of the plant 10 is recorded, which is schematically illustrated at 84 in FIG. 4.

At step 86, the FRF (frequency response function) is computed from the recorded manipulated variable signal 19 and recorded feedback signal 15A. The inverse transform of the FRF is computed to obtain the impulse response function at step 88. It should be noted that a fundamental attribute of the data collected in storage 84 is to provide one estimate of the plant 10 dynamics with sufficient fidelity and certainty. Further, storage 84 represents collection of such data, whether actually stored or used in real time. Thus, depending on the capabilities of the computer executing the tuning assembly 60 and/or controller 14, it is possible to ascertain control parameters "online" (when the plant 10 is operating) or "offline" without further operation of the plant 10.

Figure 8:
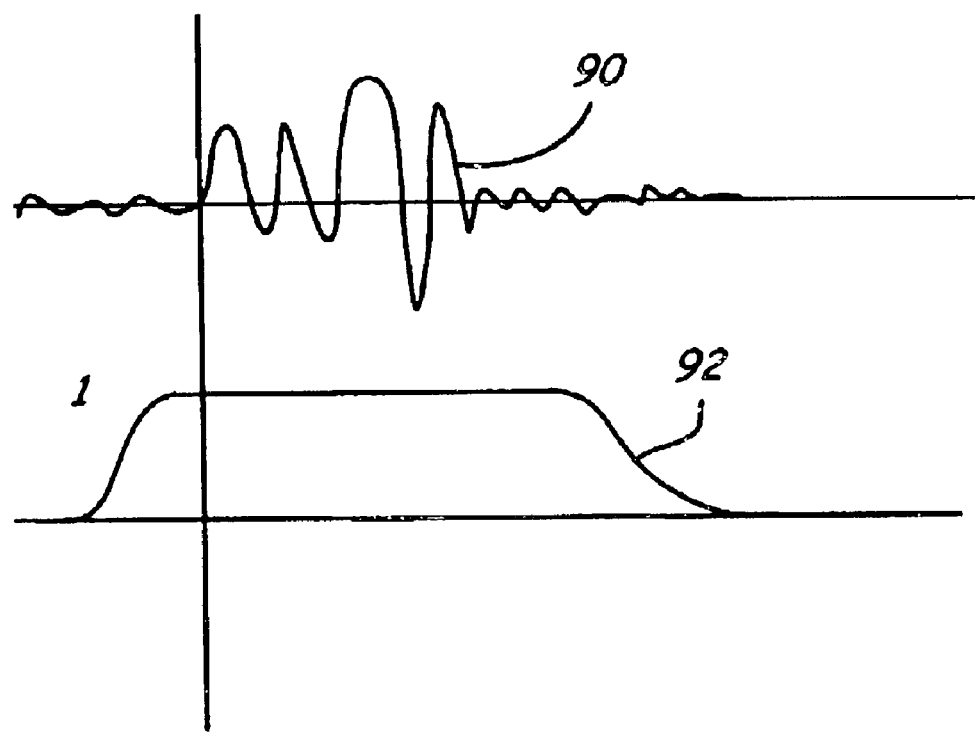
FIG. 8 is a plot of an impulse response function and a tapering function.

To reduce the noise, which may be present in the signals, the inverse response functions can be tapered at step 89 to increase model fidelity. FIG. 8 illustrates a representative impulse response function at 90. A tapering function 92 can be applied to the impulse function 90 to remove content known to be noise. Characteristics of the tapering function 92 (i.e. duration and shape of the taper) can be adjusted depending on noise, damping, etc. characteristics of the system, but represent Fourier truncated physically realizable elements.

At step 96, perform forward transformation of the impulse response functions (possibly, tapered) at discrete values along the complex z domain contour (FIG. 5), or the complex s domain contour (FIG. 6), thereby producing a frequency domain model 70 consistent with the servo controller model 64, described above. This process minimizes the number of data points and produces a model that is consistent with the servo controller model 64.

At step 98, elements of the frequency domain model 70 can be normalized in order to ease interpretation of values used during optimization discussed below. For instance, an element representing displacement feedback can be normalized to correspond to 1/s at low frequencies. At step 100, the plant model 70 and the normalization factors are. stored.

The tuning assembly 60 can be implemented on a suitable computer or computers, for instance, the computer 30 discussed above. Generally, as discussed above, the tuning assembly 60 uses a model of the system controller 14 and a model of the plant 10, both in the frequency domain, in order to estimate a performance index as a function of controller parameter settings and user constraints. Optimization of the performance index using an optimization algorithm such as Nelder-Mead yields the best set of controller parameters for the servo controller 14.

Before discussing in detail operations performed by the tuning assembly 60, a brief review of multi-variable control theory may be helpful.

With all the terms illustrated in FIG. 3 determined, the closed-loop (cl) frequency response can be calculated as:

$$Gcl=[I+Km^*H^*Gp^*Gc]^{-1}*Km^*Gp^*Gc \qquad (1)$$

From this relationship it can be observed that, if the elements were stable (have no "rhp" (right-half-plane) poles), then any rhp poles in the closed-loop solution would result from the inverse operation. If the inverse is represented as the adjoint/determinant, it can be seen that any rhp poles would result from rhp roots of the equation:

$$\text{determinant}([I+Km*H*Gp*Gc])=0 \qquad (2)$$

Thus stability can be determined by analysis of the determinant, represented in this case as a scalar valued function of complex frequency.

A Nyquist plot of the determinant can thus be used to ascertain stability (note encirclement of the origin in this case). However, this does not produce a measure of stability margin. A method for establishing a stability margin is to decompose the term H*Gp*Gc (the open-loop TF with Km factored out) using a Schur decomposition to obtain:

$$\text{determinant}(U*[I+Km*GHt]*U')=0 \qquad (3)$$

where GHt is a triangular matrix of functions of frequency, U is a unitary matrix of functions, and "'" denotes conjugate transposition.

Since the determinant of the product is the product of the determinants and the determinant of a diagonal matrix is the product of the diagonals, this results in $$\text{determinant}([I+Km*GHd])=0 \qquad (4)$$

where GHd contains the diagonal elements of GHt (eigenfunctions).

With this written as $$(1+Km*GHd(1))*(1+Km*GHd(2))*=0 \qquad (5)$$

it can be seen that the term of the product closest to zero (Km*GHd(i) closest to minus one) will determine the stability margin. It should also be observed that a plot of all Km*GHd(i) terms grows linearly with Km.

As indicated above, the tuning assembly 60 optimizes the controller parameters based in part on user constraints, which in the block diagram of FIG. 4 is illustrated at 101. Generally, user constraints can include constraints on independent variables, i.e., the parameters of the controller and constraints on system performance (e.g. stability margin and peaking of the closed-loop frequency response).

Figure 9:
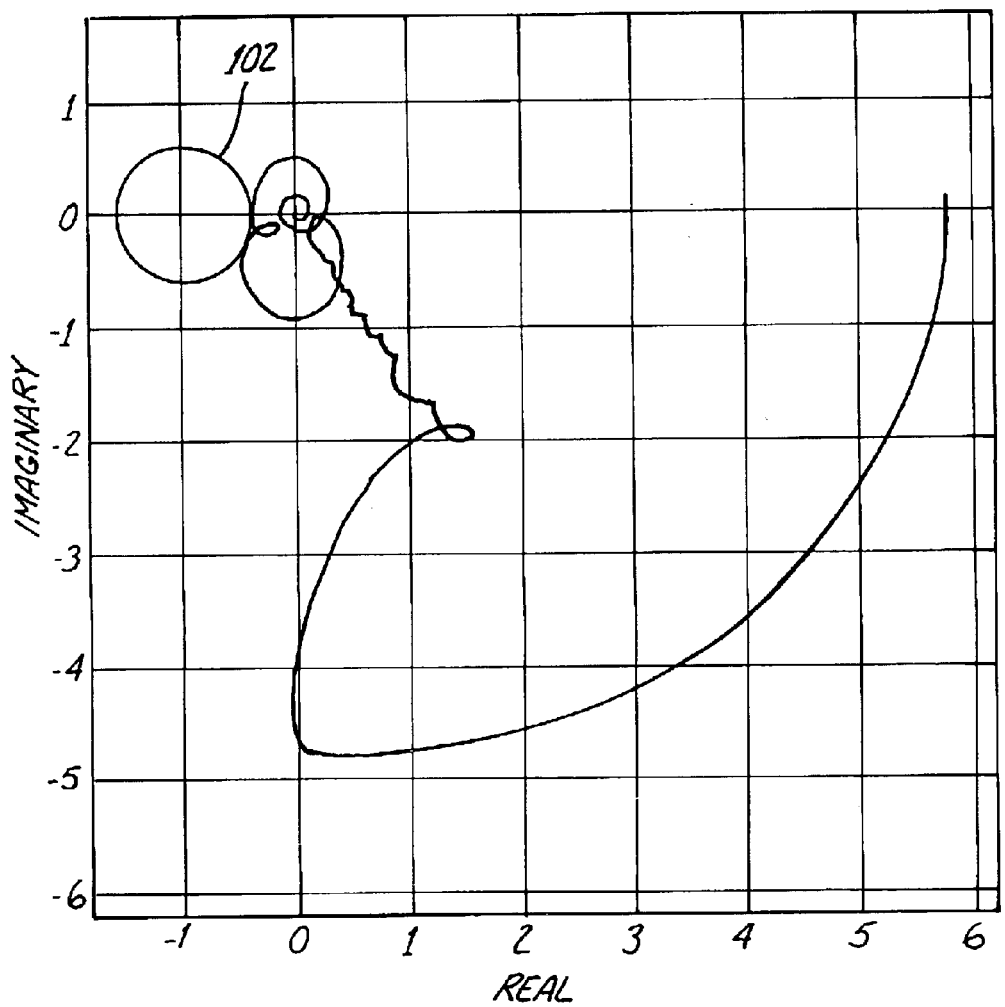
FIG. 9 is a two-dimensional Nyquist plot of a single channel.

FIG. 9 illustrates a convenient representation for analyzing stability margin. In this example, the circle 102 around "-1,0" represents the stability margin boundary user constraint. The shape is user adjustable. Although a constant radius is shown, other shapes of the stability margin boundary constraint can be used. In this example, a single channel Eigen-value trajectory is plotted.

Figure 10:
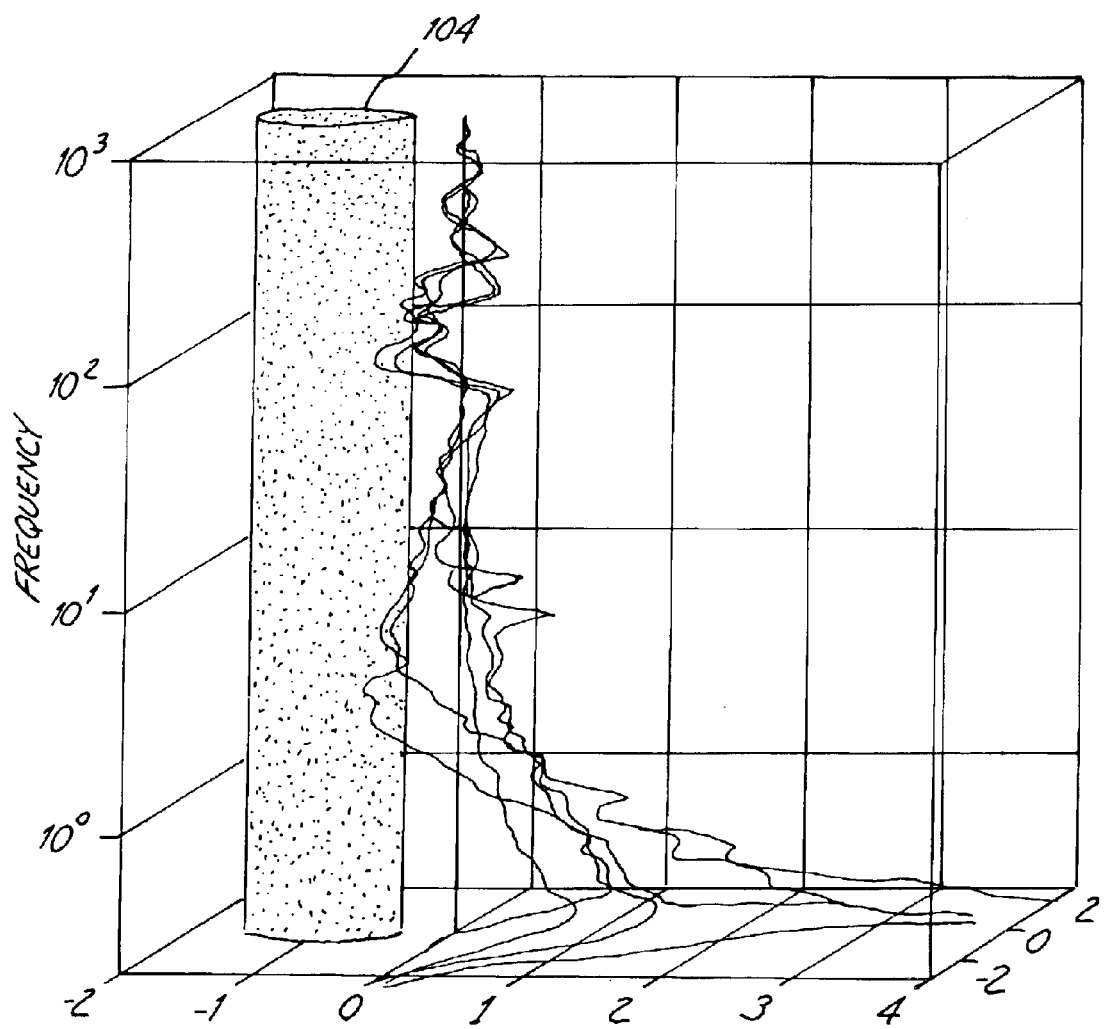
FIGS. 10 and 11 are three-dimensional Nyquist plots.

In yet a further embodiment, Nyquist stability can be plotted in three dimensions with frequency as the third dimension and the stability margin is illustrated as a tube or column 104, herein having a constant radius centered on "-1,0". FIG. 10 is an example of such an illustration.

It should be noted that FIG. 10 illustrates a multi-channel example. With this form of illustration, a user can easily determine the important frequencies affecting stability as viewed by plotting the Eigen-value trajectories.

Figure 11:
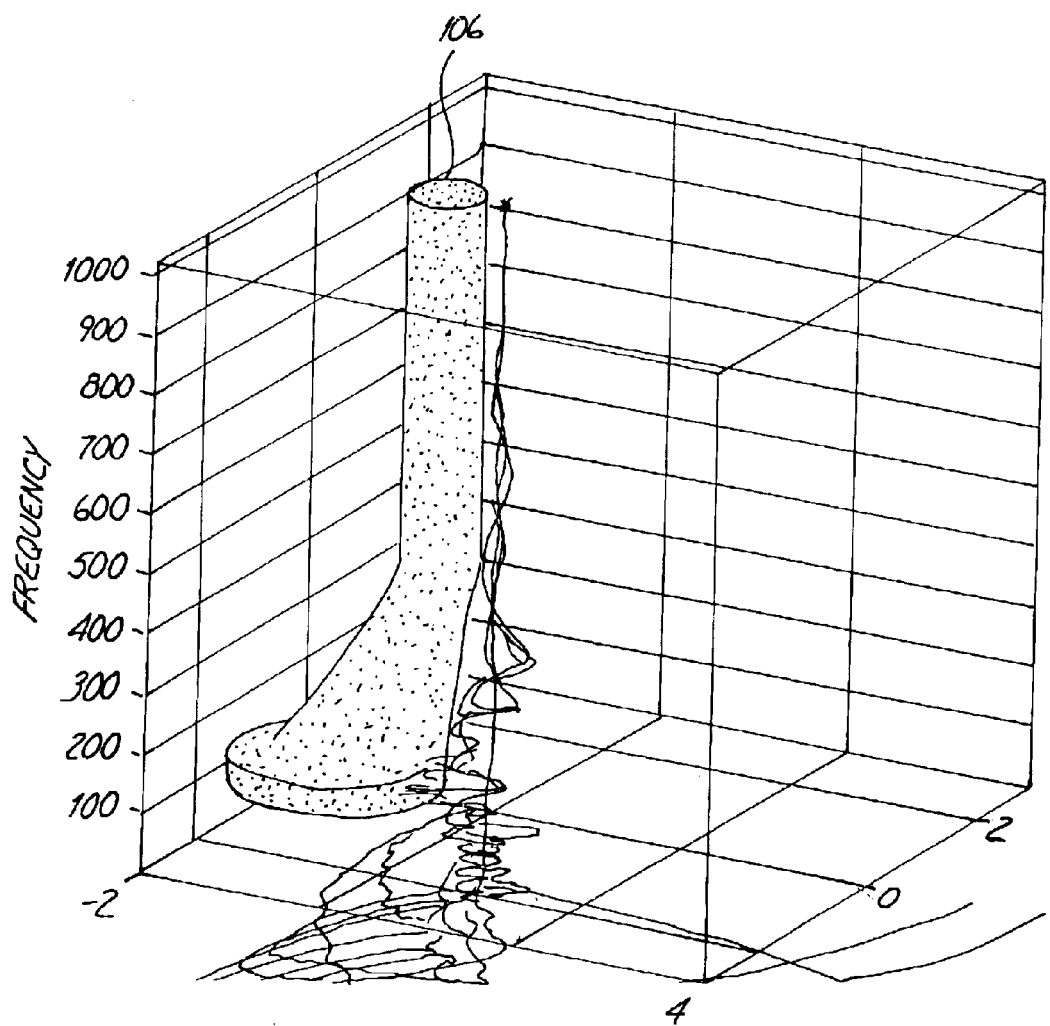

In yet a further embodiment, the stability margin boundary constraint can be allowed to vary as a function of frequency. FIG. 11 illustrates a stability margin boundary (herein a tube 106 having portions of different radii centered at varying positions on the real-imaginary plane) allowing increased stability margin in regions of greater uncertainty such as at higher frequencies. As appreciated by those skilled in the art, viewing of the three-dimensional renderings of FIGS. 10 and 11 can be changed as desired to allow the trajectories to be readily seen with respect to the stability margin. Although the shape of the stability margin boundary 106 can be adjusted, predetermined shapes can be stored and selected by the user.

Figure 12:
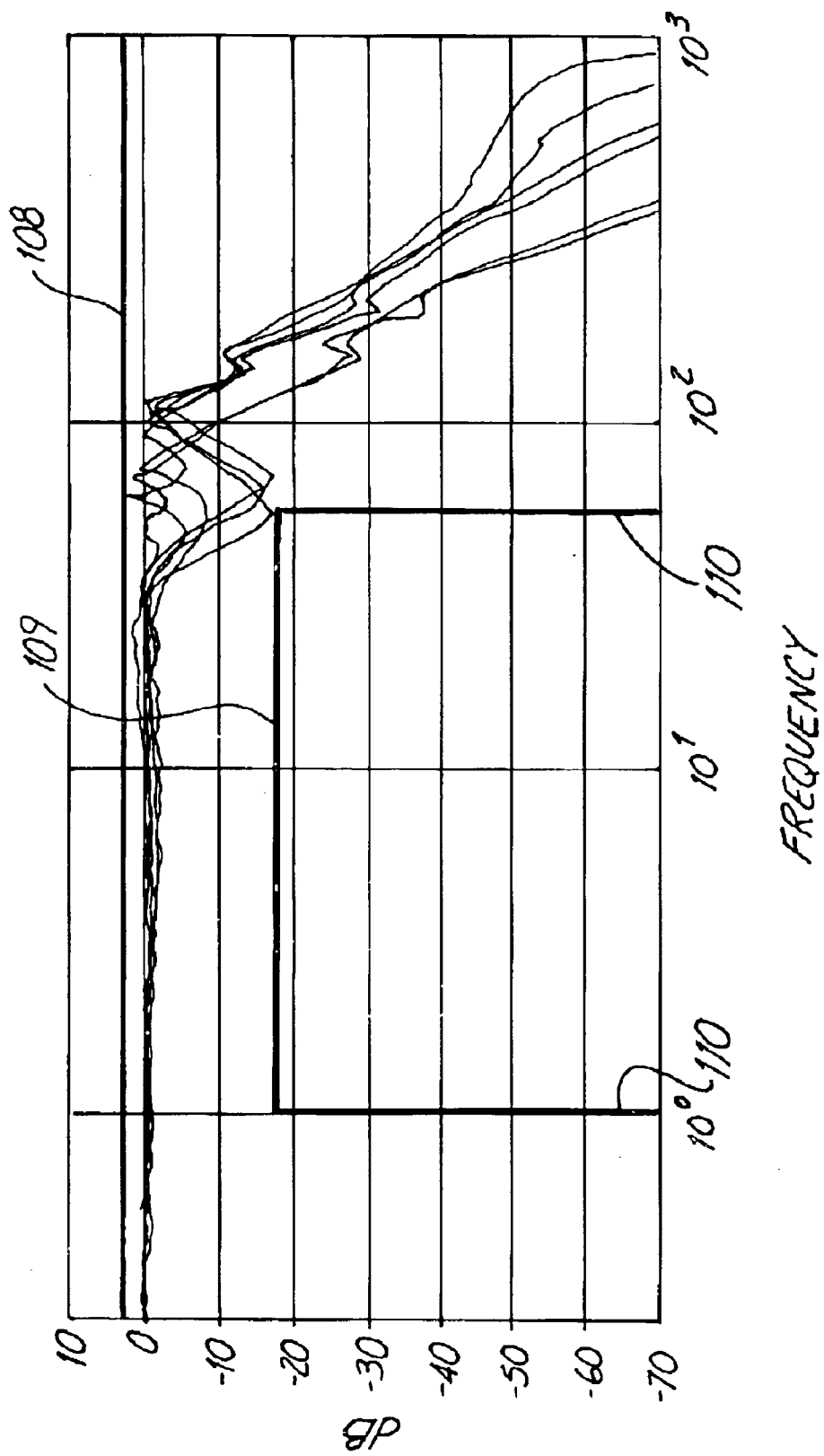
FIG. 12 is a plot of magnitude v. frequency for a plurality of channels.

As discussed above, besides accounting for stability, other possible system performance user constraints can include frequency domain peaking. FIG. 12 graphically illustrates an absolute upper limit 108 throughout the entire frequency spectrum. FIG. 12 also illustrates a "tuning bandwidth" 110 that is user selectable. The tuning bandwidth defines the frequency region of primary interest for closed-loop performance.

Figure 13:
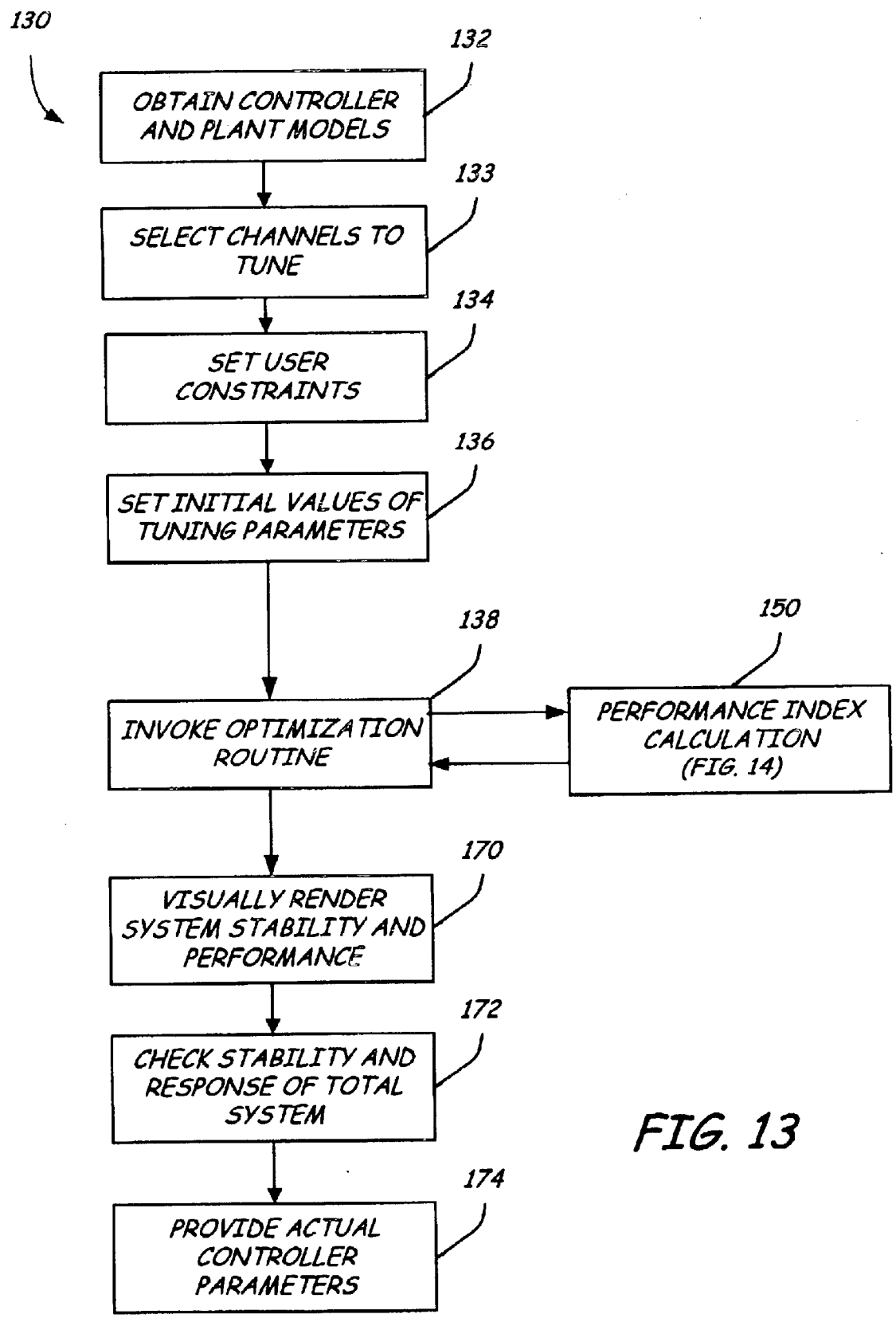
FIG. 13 is a flow diagram for a tuning procedure.

Referring back to the tuning assembly 60, a tuning procedure is generally illustrated in FIG. 13 at 130. At step 132, the controller model 64 and the plant model 70 are obtained as discussed above.

At step 133, the user can select all or a subset of channels (manipulated variables and feedback responses) to tune or optimize. In many system environments, cross-coupling between channels can be more prevalent for some channels than for others. For instance, in a road simulator discussed generally in the background section, loads and motions can be applied to each of the vehicle spindles from separate loading assemblies coupled to each of the vehicle spindles. Each loading assembly comprises separate actuators and linkages that are operated to apply forces and motions with respect to an orthogonal set of axes, generally with one axis corresponding to the spindle axis. Each loading assembly includes a set of manipulated variable signals for controlling the servo valves of the actuators and a set of corresponding feedback signals. If each vehicle spindle includes a loading assembly, then four sets of channels (manipulated variable signals and feedback signals) are provided to the servo controller. However, cross-coupling may be minimal between some sets of loading assemblies, or even some channels in any one loading assembly. For instance, cross-coupling is generally low between the front and rear vehicle spindle loading assemblies.

Step 133 allows the user to select which channels (a subset or all) to tune or optimize. In this manner, if desired, the user can individually select single input and single output channels to optimize, or select a subset of channels to optimize. Generally, it is faster to optimize a plurality of subsets of channels or portions of the plant, than to optimize the complete plant at once. By processing the plant in subsets, some cross-coupling is ignored, but as stated above, this may be acceptable given the configuration of the plant.

It should also be noted that by allowing the user to select individual or subset of channels to optimize, plant diagnostics can be provided. For instance, it may be apparent from the plant model or from the optimization procedure that channels are totally dysfunctional or poorly performing. In this manner, the optimization or tuning procedure can be used to diagnose problems in the plant. This is particularly true when using single channel tuning repeated over all the channels since this determines the adequacy of performance of each channel operating without interaction with other channels.

At step 134, the user provides user constraint values. As described above, user constraint values include stability margins, if desired, as a function of frequency, a frequency domain peaking limit and the tuning bandwidth.

In one embodiment, the gains in the controller model 64 are normalized by frequency by a nominal frequency of operation. At step 134, the user constraint values can also include an expected system bandwidth 110 (FIG. 12).

At step 136, initial values of the tuning parameters are provided. If the tuning parameters were normalized, each of the initial values can be set to their nominal value of one.

The optimization routine, such as Nelder-Mead, is then invoked at step 138. The optimization routine repeatedly provides a set of controller parameters 140 to the performance calculator 63, and a performance index 142 is returned from the performance calculator 63 until an optimum value is achieved (i.e. within a selected tolerance range) (FIG. 4). The optimization routines are readily available and well known, such as in the routines available from Mathworks, Inc. of Natick, Mass., U.S.A.

Figure 14:
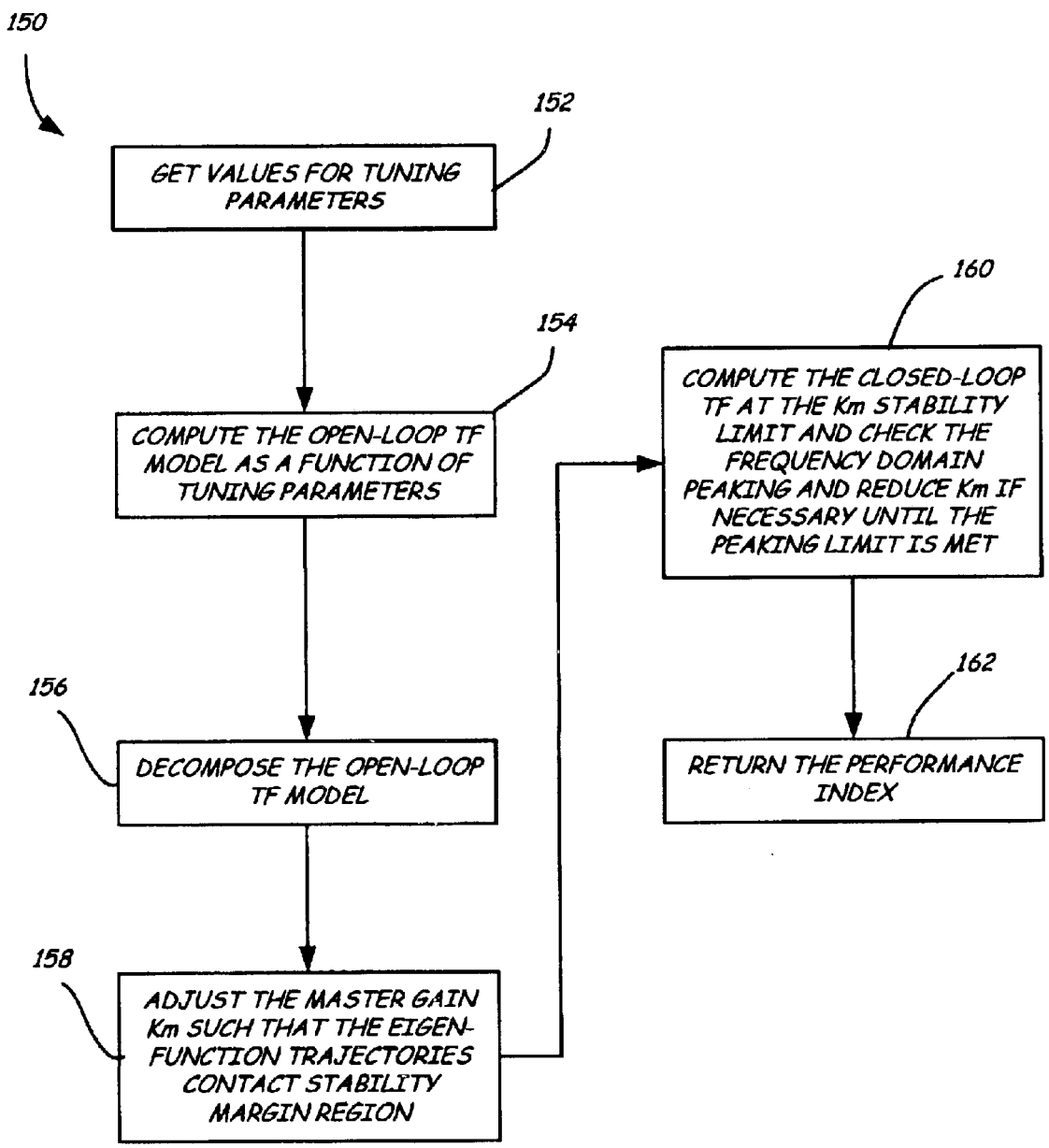
FIG. 14 is a flow diagram for calculating a performance index.

Calculation of the performance index by the performance calculator 63 is illustrated in FIG. 14 as method 150. At step 152, a set of tuning parameters (independent variables) is received by the performance calculator 63 from the optimizer module 62. Generally, the tuning parameters comprise the derivative gains, the second derivative gains (if present), various feedback and/or forward loop filter settings. Optionally, a function of the proportional gains can be included. In many instances, the proportional gains can be incorporated into the performance index, i.e., maximizing the proportional gain can be a desired parameter for a single channel system.

At step 154, the open-loop TF model (H*Gp*Gc) is computed as a function of the tuning parameters accounting for any constraints on the independent variables including filter settings. It should be noted that such constraints can also be conveniently handled by a optimization routine, which handles constraints directly.

At step 156, the open-loop TF model is decomposed frequency-by-frequency using the Schur decomposition that produces the Eigen-functions. If desired, Eigen value decomposition can be used.

The master gain Km is adjusted (typically an iterative algorithm) at step 158 such that the Eigen-function trajectories contact the stability margin region (nominally a region, for example, a circle, ellipse, etc. that includes (−1,0) of the complex plane).

At step 160, the closed-loop plant response is computed as $[I+Km*H*Gp*Gc]^{-1} *Km*Gp*Gc$. If peaking of the closed-loop response exceeds a specified maximum value, lower Km until the specified maximum value is achieved (typically an iterative algorithm). A property of Km is that the stability margin is increased and so the constraint on stability is still met.

The value obtained for Km in step 160 plus optionally an additive weighted performance value is returned at step 162 to the optimizer module 62.

Figure 15:
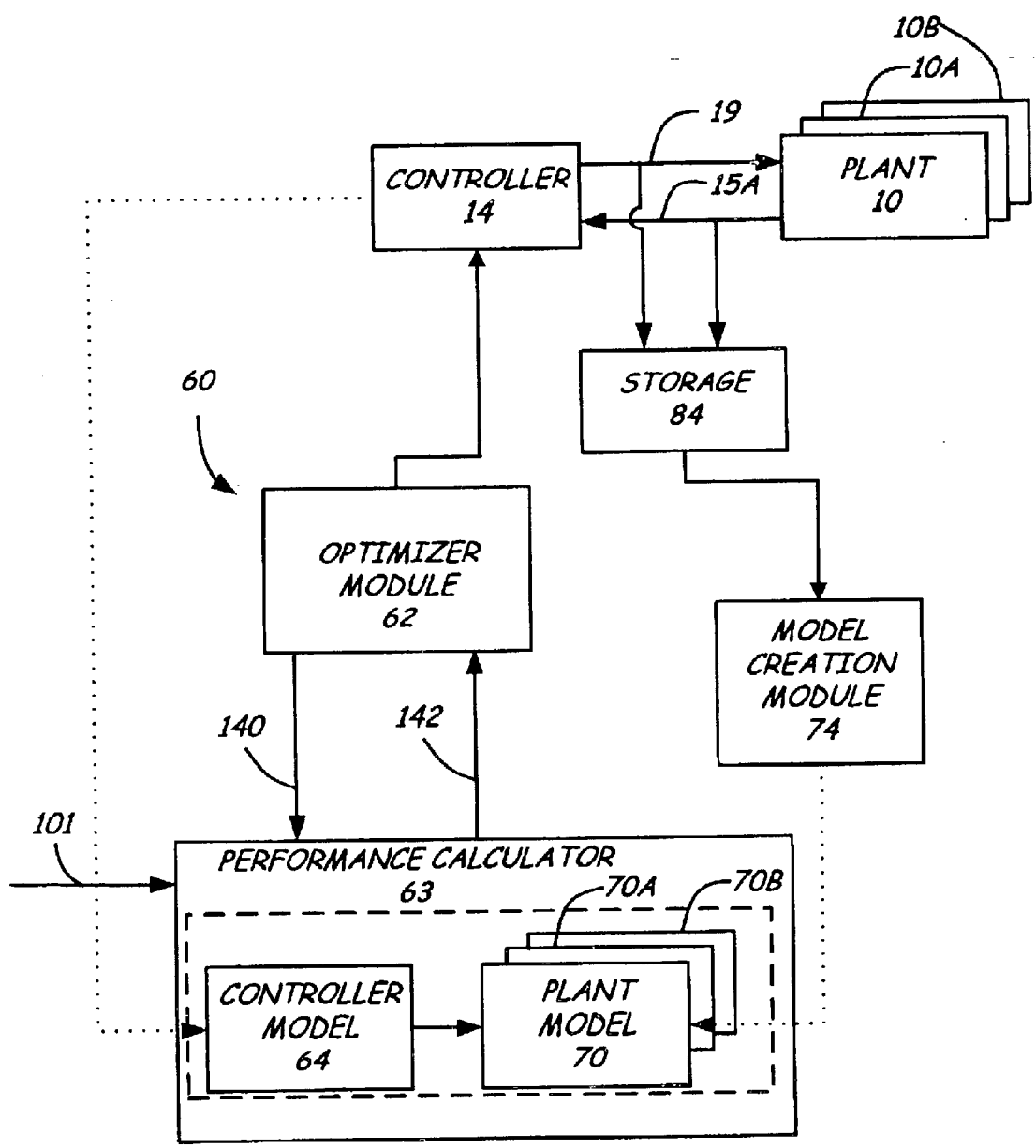
FIG. 15 is a block diagram illustrating the tuning assembly with multiple plant configurations.

It should be noted at this time in a further embodiment illustrated in FIG. 15 that the plant can comprise multiple configurations indicated at 10, 10A and 10B. For example, the different configurations 10, 10A and 10B can be for different test specimens or no specimen, plant operating levels, or other variations of plant operations. For each of the plant configurations 10, 10A and 10B, a corresponding plant model 70, 70A and 70B would be obtained. The tuning assembly 60 can ascertain the best set of controller parameters that would be useable over all of the various plant configurations. In particular, one set of tuning parameters would be provided at step 152, but each of the steps 154, 156, 158 and 160 would be performed for each of the plant configurations. This entails at step 158 to adjust the master gain Km until each plant configuration satisfies the stability margin for all system model configurations. Once the maximum master gain Km has been determined that produces stability in all models, at step 160 the master gain Km is reduced further, if necessary, so that the peaking limit is met across all channels for all plant configurations. In further embodiments, the peaking limit can be a function of each channel and/or a function of frequency.

Referring back to FIG. 13, at step 170, visual renderings can be provided to the user to show stability and system performance using the optimized parameters. The renderings, comprising another aspect of the present invention, can include any of the three-dimensional Nyquist plots described above. By plotting the Eigen-value trajectories, the user can readily confirm that system stability has been been met because the trajectories will not visually intersect with the selected stability margins. Likewise frequency peaking can be visually rendered such as illustrated in FIG. 12.

If the plant was optimized based on processing a plurality of subsets of channels, it may be beneficial to check the stability and performance of the system model using the controller parameters ascertained based on optimizing the parameters in subset calculations. At step 172, visual renderings similar to step 170 for system stability and system performance can be provided to the user for the complete system. If any of the Eigen-value trajectories visually intersect with the selected stability margins, system stability may not be acceptable. Likewise frequency peaking can be checked by visually rendering system performance such as illustrated in FIG. 12. It should be noted visual rendering is not required, but is a convenient form for interpreting system stability and/or system performance. Of course, other forms of indications (e.g. numerical tables, audible alarms, etc.) can be provided to the user to convey violations of system model stability or system model performance.

At step 174, using the stored normalization values of the plant model and the controller model, the control parameters for the controller 14 are calculated as a function of the optimum set of controller parameters determined by the optimization routine.

The "performance index" is a measure of "goodness" of the servo-system. This generally is a measure of control bandwidth. There is a convenient relationship between controller parameters and control bandwidth when using a normalized plant (scaled to 1/s), that is:

$$F_{BW}=Km*Kp*2\Pi Hz \qquad (6)$$

Note that with the normalized plant, Kp can be treated as having units of rad/sec, the loop bandwidth.

In a multi-channel system Kp is a vector of length equal to the number of channels (Km is always a scalar) . If Kp is a vector of equal constants (if normalized, i.e. the proportional gains being of a selected relationship among each other), then all channels will have equal loop bandwidth with the loop bandwidth value determined by Km*Kp. Thus maximizing Km over the tuning parameters (derivative gains, filter settings, etc.) makes sense. All channels operating with the same loop bandwidth is highly desirable in systems such as multi-axis tracking systems. In this case, system performance is limited by the weakest channel by necessity.

The weakest channel in a system is determined by individual loop dynamics as well as cross-coupling to other channels. When cross-coupling is present, channels are sharing stability in some sense. Thus increasing loop-bandwidth of one channel can require that loop-bandwidth be lowered on one or more other channels.

Distributing loop-bandwidth amongst channels can be accomplished be setting the elements of the Kp vector to different values before optimizing Km. The channel least able to make its relative loop-bandwidth will produce the value of Km at the optimum.

In cases where it is desirable to have each channel operating at as high a loop-bandwidth as possible together with all other channels, the optimization process can take on a more complex form. A useful example is:

$$\text{Performance Index} = \sum_i \left(\frac{K_m K_{p,i}}{\omega_{ref}}\right)^x \quad (7)$$

with $\omega_{ref}$ set to the nominal loop-bandwidth and x having a value between 0 and 1 with a nominal value of 0.5. This performance index puts the greatest emphasis on the weakest channels, while encouraging channels that are not compromised by cross-coupling to have as high a loop-bandwidth as possible. With this performance index, optimization must be performed over the Kp's as well as the tuning parameters previously mentioned. Values for x greater than 0.5 puts even greater emphasis on the weaker channels, while values less than 0.5 puts less emphasis on the weaker channels.

Another useful variation of the performance index is to include a factor that puts more focus on a particular frequency range. An example is the minimum (graphically illustrated at 109 in FIG. 12) of the closed-loop frequency response over a user specified frequency range. This can be applied to each individual channel (diagonal elements) or taken as the minimum over all diagonal elements.

When applied to individual channels (diagonal elements) this effect can logically be included in the loop balancing performance index of Eq. 7.

Another variation of the performance index is to apply Eq. 7 to preselected groups of channels rather than to each channel individually. Each term in the sum would be a measure of the performance of the group to be balanced against the group. This can be especially useful in the case of symmetry, side-to-side symmetry of channels of the plant, for example. In this case, the corresponding left-side and the right-side channels can be treated as a pair and form a group in the overall process.

A wide variety of multivariable servo system models can be represented using the diagram illustrated in FIG. 3. However in other multivariable systems an alternative embodiment of FIG. 16 can be beneficial. In this configuration, the plant 10 is represented as a combination of a plurality (e.g. four) controller blocks. In particular, there is a separate block or model for each feedback variable type. In the illustrated example, each of the models G1, G2, G3 and G4 represents a model of each of the controlled variables as a function the manipulated variable all in a multivariable system sense. For instance, the outputs of G1–G4 in a vibration system, can correspond to the controlled variable, displacement feedback, velocity feedback and acceleration feedback, respectively. Kp, Kd and Kdd are adjustable vector of gains for G2, G3 and G4, respectively. Km is the master gain similar to that discussed above.

Figure 16:
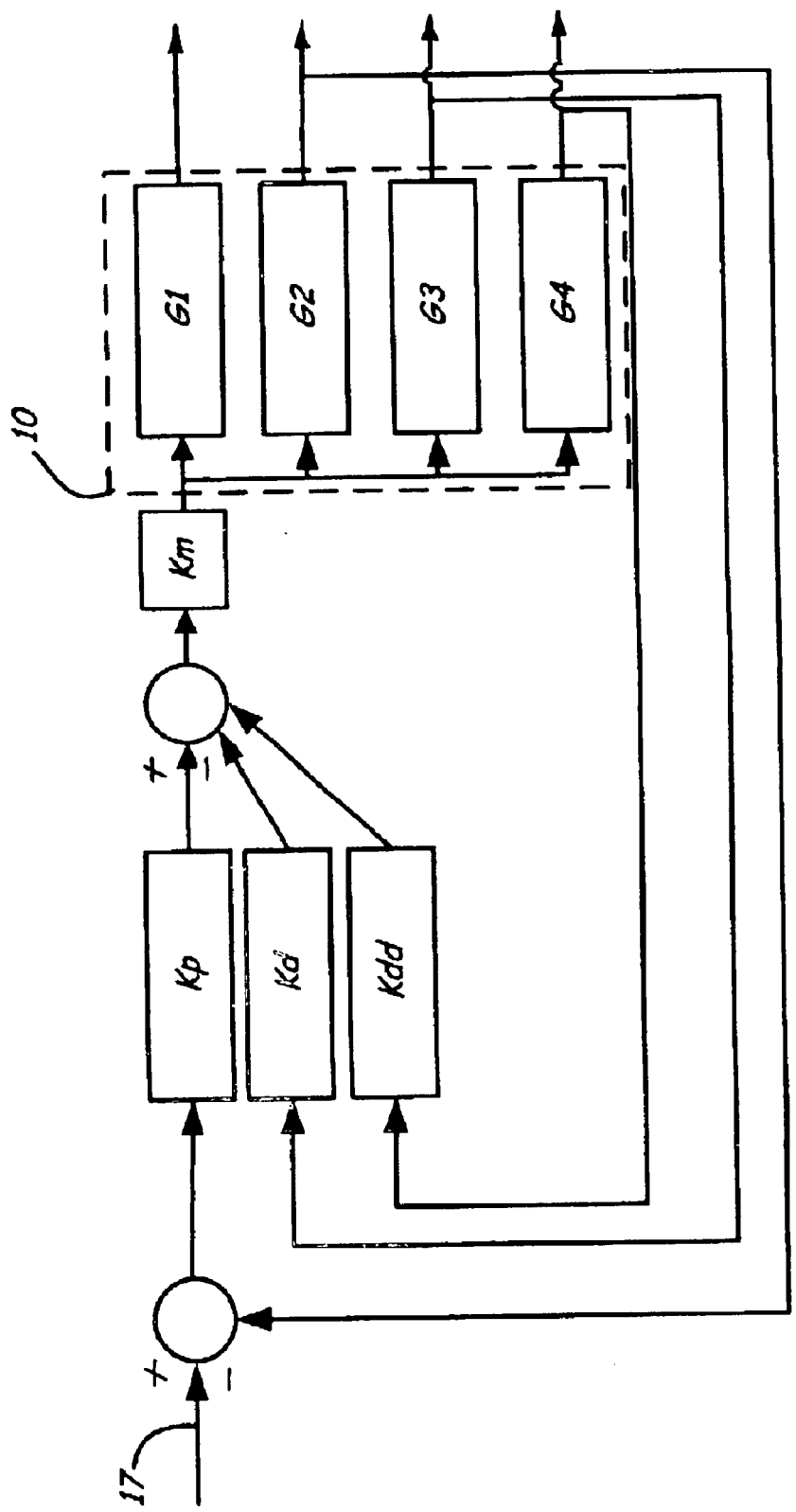
FIG. 16 is a block diagram illustrating components of a second form of a closed-loop control system for the environment of FIG. 1.

This configuration of FIG. 16 can be tuned using the tuning assembly 60 in an optimal manner similar to FIG. 3, where the closed loop frequency response can be represented as:

$$Gcl = G1*[I + Km*(KpG2 + KdG3 + KddG4)]^{-1} KmKp \quad (9)$$

and where the characteristic equation is:

$$\text{Determinant}([I + Km*(KpG2 + KdG3 + KddG4)]) = 0 \quad (10)$$

Figure 17:
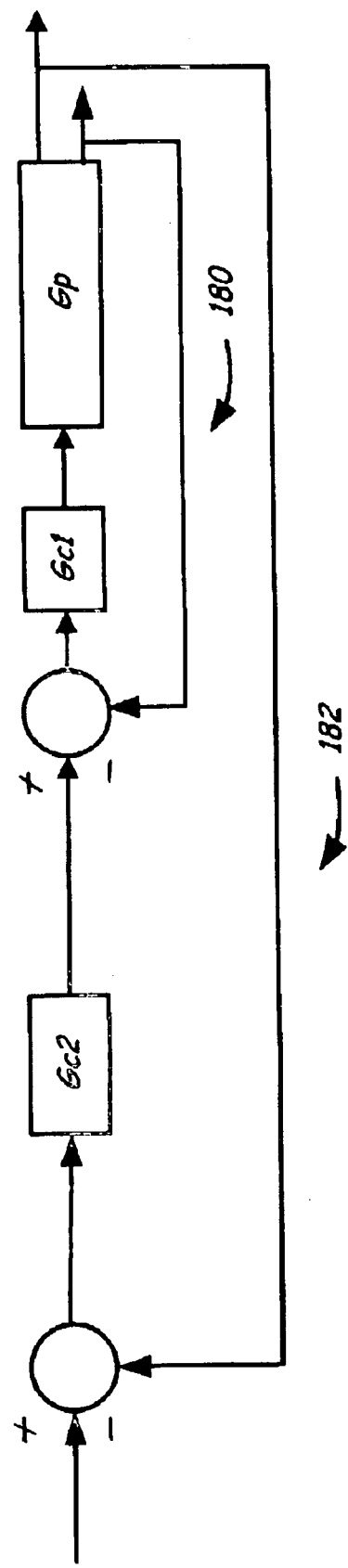
FIG. 17 is a block diagram illustrating a cascade control-loop.

It should also be noted that the present invention can also be applied to servo control configurations involving a loop within a loop. One example is the well-known Cascade configuration having an inner loop 180 and an outer loop 182, the outer loop 182 including the inner loop 180 as illustrated in FIG. 17. The tuning procedure can be first applied to the inner loop 180. With the control parameters of inner loop 180 ascertained, the inner loop 180 becomes part of the plant for the outer loop 182, at which point the tuning procedure can then be applied to the outer loop 182 to ascertain the control parameters thereof. In yet a further embodiment, the tuning or optimization procedure of the outer loop 182 can include as a portion of its performance index calculation, the tuning procedure of the inner loop 180.

While the description thus far covers closed-loop tuning/optimization it is straightforward to extend the system/model to include open-loop series compensation since stability is not affected by open-loop series compensation.

Although the present invention has been described with reference to preferred embodiments, workers skilled in the art will recognize that changes may be made in form and detail without departing from the spirit and scope of the invention. For instance, while frequency domain calculations are often optimal, in some situations, it may be beneficial to use other model forms such as finite element models or kinematic models.

What is claimed is:

1. A method of ascertaining control parameters for a control system having a controller and a plant having multiple plant input and response channels, the method comprises:

establishing a model of the plant with multiple plant input and response channels at least some of the channels having cross-coupling effects, and establishing a model of the controller; and calculating a performance index for a closed-loop system as a function of controller parameters, accounting for selected constraints on at least stability margins.

2. The method of claim 1 and further including: providing an optimization routine, the optimization routine repeatedly performing the step of calculating the performance index.

3. The method of claim 2 wherein the optimization routine repeatedly performs the step of calculating the performance index until an optimum value is achieved.

4. The method of claim 3 wherein the plant model and the controller model each comprise multiple channels, and wherein the controller parameters include a vector Kp having elements pertaining to proportional gains for each channel of the controller model, the proportional gains being of a selected relationship among each other, and wherein the performance index is a function of a master proportional gain Km that is applied to each channel of the controller model, and wherein the performance index is repeatedly calculated to maximize Km in a manner that maintains constraints on at least stability margins.

5. The method of claim 3 wherein the plant model and the controller model each comprise multiple channels, and wherein the controller parameters comprise a vector Kp having elements pertaining to proportional gains for each channel of the controller model, and wherein the performance index is a function of a master proportional gain Km that is applied to each channel of the controller model, and wherein the performance index is calculated as a function of:

$$\sum_i \left(\frac{K_m K_{p,i}}{\omega_{ref}}\right)^x$$

where $\omega_{ref}$ is set to a nominal loop-bandwidth, x comprises a value between 0 and 1 and i is a running index over all channels of the controller model.

6. The method of claim 1 wherein the constraint on stability margin varies as a function of frequency.

7. The method of claim 6 and further comprising rendering a three dimensional surface illustrating constraints on at least stability margins as a function of frequency.

8. The method of claim 1 wherein calculating the performance index includes accounting for constraints on frequency domain peaking.

9. The method of claim 8 wherein the constraints comprises a constant.

10. The method of claim 1 wherein calculating the performance index includes accounting for a weighting factor on the minimum value of frequency response over a specified range of frequencies.

11. The method of claim 1 wherein establishing a controller model and plant model in the frequency domain includes establishing the controller model and the plant model over a closed-trajectory on the complex plane as part of establishing stability over said region on the complex plane.

12. A method of ascertaining control parameters for a control system having a controller and a plant, the method comprises:

establishing a model of the plant and a model of the controller; and calculating a performance index for a closed-loop system as a function of controller parameters, accounting for constraints on at least selected stability margins as a function of frequency.

13. The method of claim 12 and further comprising rendering a three dimensional surface illustrating constraints on at least stability margins as a function of frequency.

14. The method of claim 12 and further including: providing an optimization routine, the optimization routine repeatedly performing the step of calculating the performance index.

15. The method of claim 14 wherein the optimization routine repeatedly performs the step of calculating the performance index until an optimum value is achieved.

16. The method of claim 12 wherein the plant model and the controller model each comprise multiple channels, and wherein the controller parameters include a vector Kp having elements pertaining to proportional gains for each channel of the controller model, the proportional gains being of a selected relationship among each other, and wherein the performance index is a function of a master proportional gain Km that is applied to each channel of the controller model, and wherein the performance index is repeatedly calculated to maximize Km in a manner that maintains constraints on at least stability margins.

17. The method of claim 16 wherein the plant model and the controller model each comprise multiple channels, and wherein the controller parameters comprise a vector Kp having elements pertaining to proportional gains for each channel of the controller model, and wherein the performance index is a function of a master proportional gain Km that is applied to each channel of the controller model, and wherein the performance index is calculated as a function of:

$$\sum_i \left(\frac{K_m K_{p,i}}{\omega_{ref}}\right)^x$$

where $\omega_{ref}$ is set to a nominal loop-bandwidth, x comprises a value between 0 and 1 and i is a running index over all channels of the controller model.

18. The method of claim 12 wherein calculating the performance index includes accounting for constraints on frequency domain peaking.

19. The method of claim 12 wherein the constraints comprises a constant.

20. The method of claim 12 wherein calculating the performance index includes accounting for a weighting factor on the minimum value of frequency response over a specified range of frequencies.

21. The method of claim 12 wherein establishing a controller model and plant model in the frequency domain includes establishing the controller model and the plant model over a closed-trajectory on the complex plane as part of establishing stability over said region on the complex plane.

* * * * *